(12) United States Patent
Gilbert et al.

(10) Patent No.: US 10,425,430 B2
(45) Date of Patent: Sep. 24, 2019

(54) HIERARCHICAL SCANNING OF INTERNET CONNECTED ASSETS

(71) Applicant: Expanse, Inc., San Francisco, CA (US)

(72) Inventors: Connor Leete Gilbert, San Francisco, CA (US); Michael Haggblade, San Bruno, CA (US)

(73) Assignee: Expanse, Inc., San Francisco, CA (US)

( * ) Notice: Subject to any disclaimer, the term of this patent is extended or adjusted under 35 U.S.C. 154(b) by 13 days.

(21) Appl. No.: 15/136,620

(22) Filed: Apr. 22, 2016

(65) Prior Publication Data

US 2017/0310699 A1    Oct. 26, 2017

(51) Int. Cl.
*H04L 29/06*        (2006.01)

(52) U.S. Cl.
CPC ...... *H04L 63/1416* (2013.01); *H04L 63/0236* (2013.01); *H04L 63/0245* (2013.01); *H04L 63/0428* (2013.01); *H04L 63/1433* (2013.01); *H04L 63/20* (2013.01); *H04L 63/205* (2013.01); *H04L 69/169* (2013.01)

(58) Field of Classification Search
None
See application file for complete search history.

(56) References Cited

U.S. PATENT DOCUMENTS

| | | | |
|---|---|---|---|
| 7,752,665 B1 | | 7/2010 | Robertson |
| 9,413,783 B1 * | | 8/2016 | Keogh ................ H04L 63/1458 |
| 2003/0191963 A1 * | 10/2003 | Balissat ............... H04L 63/0209 726/12 |
| 2004/0199625 A1 * | 10/2004 | Makino ................... H04L 29/06 709/223 |
| 2007/0130373 A1 | 6/2007 | Kalwitz | |
| 2010/0177650 A1 * | 7/2010 | Wittgreffe ................. H04J 3/14 370/252 |
| 2013/0275575 A1 * | 10/2013 | Hugard, IV ........ H04L 63/1408 709/224 |
| 2014/0067689 A1 * | 3/2014 | Rogers .................... G06F 21/72 705/71 |
| 2014/0351573 A1 * | 11/2014 | Martini ............... H04L 63/0428 713/153 |
| 2016/0057101 A1 * | 2/2016 | Hugard, IV ............ H04L 41/12 709/220 |

(Continued)

OTHER PUBLICATIONS

Durumeric, Zakir, et al. "A search engine backed by Internet-wide scanning." Proceedings of the 22nd ACM SIGSAC Conference on Computer and Communications Security. ACM, 2015.

(Continued)

*Primary Examiner* — Andrew J Steinle
(74) *Attorney, Agent, or Firm* — Perkins Coie LLP; Michael A. Glenn (57) ABSTRACT

A system for hierarchical scanning includes an interface and a processor. The interface is to receive an indication to scan using a payload; provide the payload to a set of addresses on a set of ports; and receive a set of responses. Each response is associated with an address and a port. The processor is to: for each response of the set of responses: determine whether a follow-up probe exists associated with the response; and in the event the follow-up probe exists associated with the response: execute the follow-up probe on the address and the port associated with the response; and store the set of data received in response to the follow-up probe in a database.

20 Claims, 8 Drawing Sheets

(56) References Cited

U.S. PATENT DOCUMENTS

2017/0353745 A1* 12/2017 Karkkainen ..... H04N 21/23476

OTHER PUBLICATIONS

Graham, "masscan / src / proto-banner1.c", https://github.com/robertdavidgraham/masscan/blob/master/src/proto-banner1.c, Sep. 1, 2014.
Graham, Robert David. "MASSCAN: Mass IP port scanner." URL: https://github.com/robertdavidgraham/masscan Apr. 24, 2014.
Gordon Fyodor Lyon, "Technique Described", Nmap Network Scanning, Chapter 7, Jan. 1, 2009.
Gordon Fyodor Lyon, "Nmap API", Nmap Network Scanning, Chapter 9, Jan. 1, 2009.
Author Unknown, "Nmap Network Scanning", https://nmap.org/book/, Jan. 1, 2009.
Author Unknown, "Nmap Changelog", https://nmap.org/changelog.html#4.21ALPHA1, Nmap 4.21ALPHA1 entry dated Dec. 10, 2006.
Kris, "NSE re-catagorization", highlighted text dated Jun. 20, 2008.
Durumeric, Zakir, Eric Wustrow, and J. Alex Halderman. "ZMap: Fast Internet-wide scanning and its security applications." Presented as part of the 22nd USENIX Security Symposium (USENIX Security 13). 2013.

* cited by examiner

HIERARCHICAL SCANNING OF INTERNET CONNECTED ASSETS

BACKGROUND OF THE INVENTION

Internet connected assets (e.g., computers, mobile devices, server systems, client systems, internet-of-things devices, etc.) comprise computing systems in communication with the Internet. Internet connected assets commonly include one or more publicly addressable communication ports, allowing any internet connected device to query the asset. Some devices allow a range of connection types (e.g., HTTP connections HTTPS connections, FTP connections, FTPS connections, telnet connections, SSH connections, etc.) over the one or more publicly accessible ports. Internet connected assets can comprise a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for hierarchical scanning comprises an interface to receive an indication to scan using a payload, provide the payload to a set of addresses on a set of ports, and receive a set of responses, wherein each response is associated with an address and a port; and a processor to: for each response of the set of responses, determine whether there exists a follow-up probe associated with the response, and in the event the follow-up probe exists associated with the response: execute the follow-up probe on the address and the port associated with the response, and store the set of data received in response to the follow-up probe in a database.

In some embodiments, a system for hierarchical scanning comprises a system for scanning network devices connected to a network (e.g., the Internet). Hierarchical scanning of a network includes probing for information and then using the information to probe more. This cycle can be performed multiple times to extract as much information from the network as is possible or as is desired. The information discovered regarding the network is then stored in a database. The hierarchical scanning is used to catalog information regarding the network (e.g., the internet). In some embodiments, a system for hierarchical scanning comprises a system for building a database of network devices and settings. The system for hierarchical scanning provides a data payload to a set of Internet addresses (e.g., every port on every IPv4 address) and receives a set of responses. In various embodiments, when a device connected to the Internet receives the payload, it provides no response, it provides a response indicating that the port is alive, it provides a response indicating a protocol associated with the port, it provides a response indicating that the device is configured not to communicate on the port, or it provides any other appropriate response. For each response received by the system for hierarchical scanning, it is determined whether there is a follow-up probe associated with the response (e.g., whether the system for hierarchical scanning comprises an algorithm for determining more information about the responding device associated with the response). In various embodiments, the follow-up probe is based at least in part on one or more of: the response, the address the response is received from, the port the response is received from, the address that received the payload (e.g., provoking the response), the port that received the payload (e.g., provoking the response), or any other appropriate information. In the event there is a follow-up probe associated with the response, the follow-up probe is executed. In various embodiments, executing the follow-up probe comprises one or more of: delivering further payloads to the responding device, interacting with the device to establish an encrypted connection, requesting data from the responding device, or interacting with the device in any other appropriate way. When the follow-up probe is completed, information received from the device is stored in a device database. The system for hierarchical scanning reduces the amount of time necessary to scan a network by a large factor compared with the worst case by providing only the initial payload to a broad swath of devices and determining from the response whether more in-depth querying is likely to produce useful information. Attempting to execute each follow-up probe on each port of each address would be completely prohibitive for large networks. A device database built using hierarchical scanning comprises information about devices, software, and settings for every port and address for a network, allowing the database to be queried for individual devices or settings of interest. For instance, in the event a compromise to a well-know encrypted communications scheme is discovered after the scheme was previously thought secure, the database can be queried for devices that support that scheme, and a systems administrator informed to fix the devices before the network is compromised.

Figure 1:
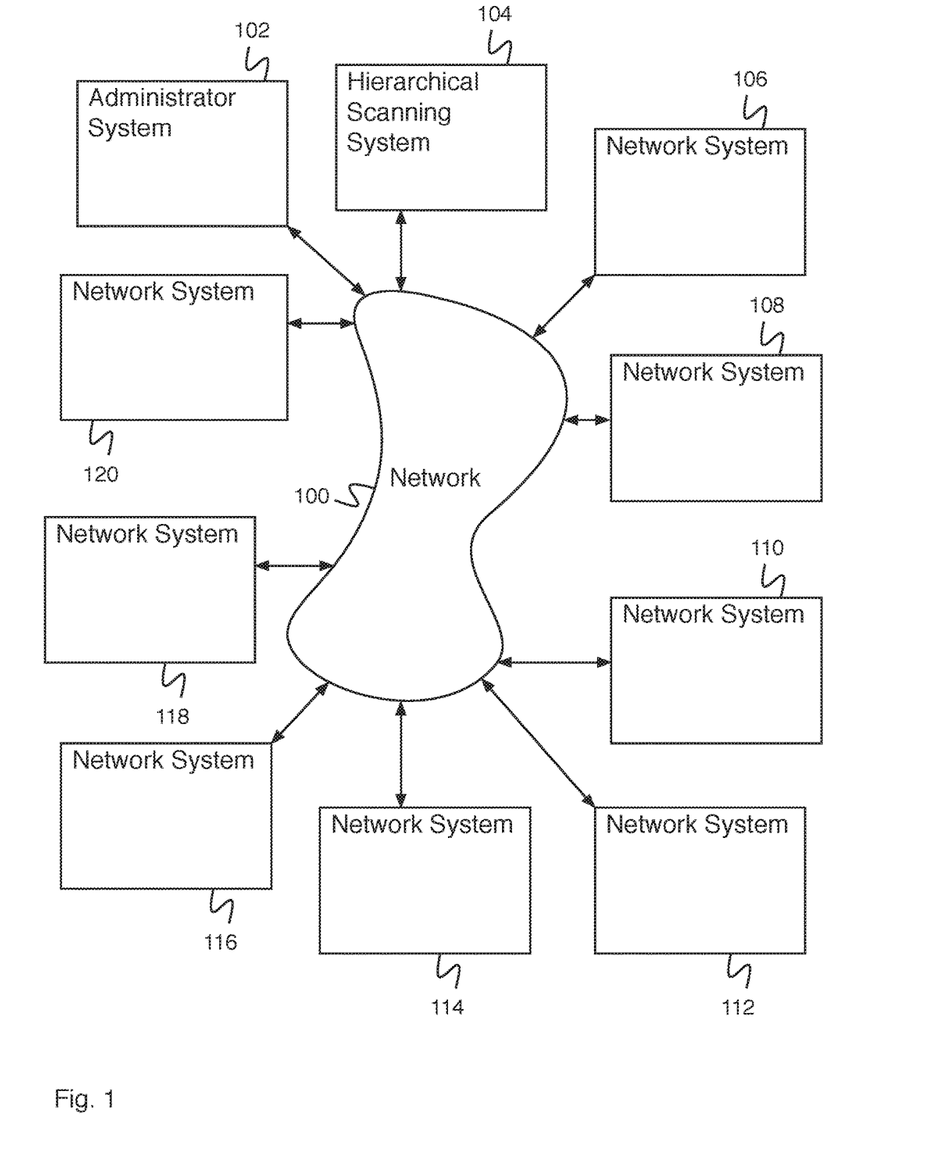
FIG. 1 is a block diagram illustrating an embodiment of a network system.

FIG. 1 is a block diagram illustrating an embodiment of a network system. In some embodiments, the network system of FIG. 1 comprises a system for hierarchical scanning of Internet connected assets. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102 and hierarchical scanning system 104 communicate via network 100. Administrator system 102 comprises a system for an administrator. In various embodiments, administrator system 102 comprises a system for an administrator to access applications on an application system, to access data on a database system, to indicate to hierarchical scanning system 104 to perform a scan, to receive data from hierarchical scanning system 104, to configure a network system (e.g., network system 106), to receive data from a network system, or for any other appropriate purpose. In some embodiments, administrator system 102 comprises a processor and a memory.

Hierarchical scanning system 104 comprises a system for scanning network systems. In some embodiments, hierarchical scanning system 104 comprises a system for scanning network systems in response to a command from administrator system 102. In some embodiments, hierarchical scanning system 104 comprises a system for scanning a set of network systems (e.g. network system 106, network system 108, network system 110, network system 112, network system 114, network system 116, network system 118, and network system 120). In some embodiments, scanning a network system comprises providing a payload to the network system and determining whether a response is received. In some embodiments, scanning a network system comprises scanning the network system using a follow-up probe based at least in part on a received response. In some embodiments, the system for hierarchical scanning comprises a system for providing a payload to all accessible network systems on all accessible ports and following up with an appropriate follow-up probe for any received responses that indicate more information is accessible. In some embodiments, hierarchical scanning system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems.

Figure 2:
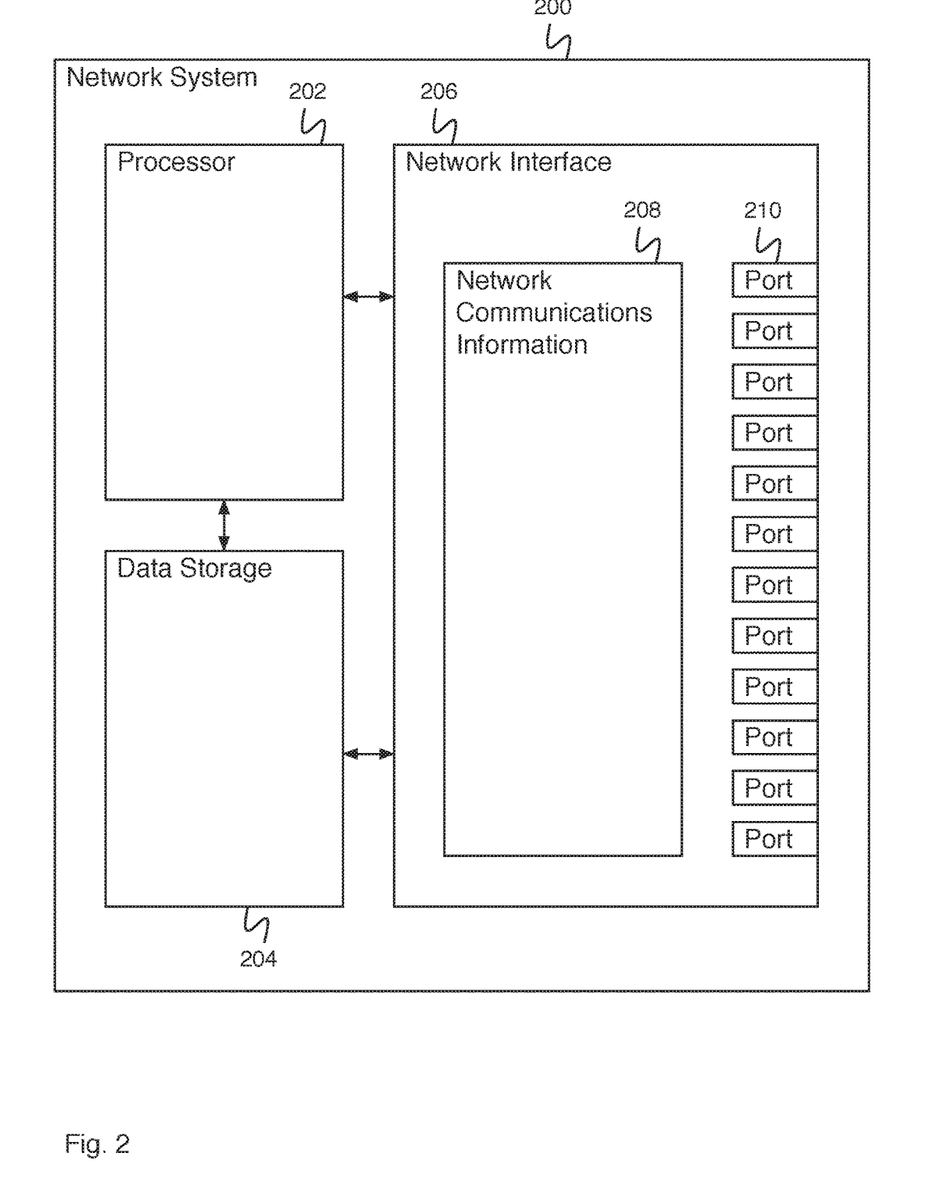
FIG. 2 is a block diagram illustrating an embodiment of a network system.

FIG. 2 is a block diagram illustrating an embodiment of a network system. In some embodiments, network system 200 comprises a network system of FIG. 1 (e.g., network system 106). In the example shown, network system 200 comprises processor 202, data storage 204, and network interface 206. In some embodiments, network system 200 comprises an Internet connected asset (e.g., a desktop computer, a laptop computer, a smartphone, a tablet computer, a server system, an internet-of-things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. In various embodiments, data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). In various embodiments, network communications information comprises network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication and some are configured to not respond to communication. In some embodiments, some ports are associated with one or more specific communications protocols (e.g., hypertext transmission protocol (HTTP), file transfer protocol (FTP), secure shell (SSH), etc.). In some embodiments, network interface 206 comprises a set of network hardware (e.g., a modem) running a set of communications software that has been configured according to a set of communications specifications.

Figure 3:
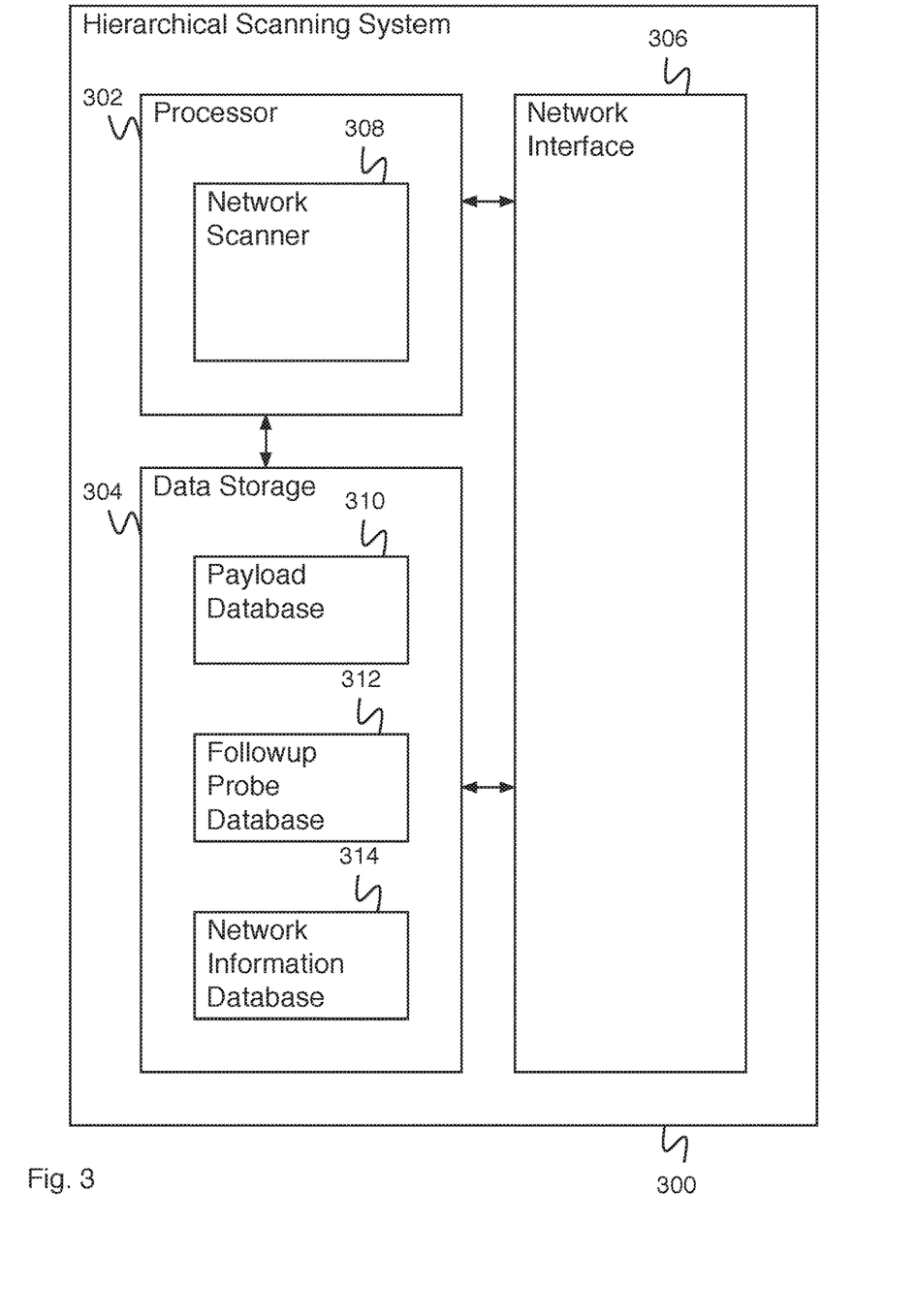
FIG. 3 is a block diagram illustrating an embodiment of a hierarchical scanning system.

FIG. 3 is a block diagram illustrating an embodiment of a hierarchical scanning system. In some embodiments, hierarchical scanning system 300 comprises hierarchical scanning system 104 of FIG. 1. In some embodiments, hierarchical scanning system 300 comprises a server system. In the example shown, hierarchical scanning system 300 comprises processor 302, data storage 304, and network interface 306. In various embodiments, processor 302 comprises a processor for executing instructions, processing data, responding to commands, etc. In various embodiments, processor 302 comprises a general-purpose processor, a microcontroller, a parallel processing system, a cluster of processors, or any other appropriate processor. In some embodiments, processor 302 comprises network scanner 308. In various embodiments, network scanner 308 comprises software and/or hardware implementing hierarchical scanning system functionality. In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises payload database 310 for storing payloads for providing to network devices. In some embodiments, a payload comprises a small data packet for probing a network device in order to elicit a response. Data storage 304 additionally comprises follow-up probe database 312 for storing follow-up probes for interacting with network devices. In some embodiments, a follow-up probe comprises software for interacting with a network device in order to determine information about the network device. In some embodiments, follow-up probe database 312 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 304 additionally comprises network information database 314 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 306 comprises a network interface for interacting with remote systems via a network. In various embodiments, network interface 306 comprises a network interface for providing a payload, for executing communications for a follow-up probe, for receiving network information, or for any other appropriate purpose. In some embodiments, network interface 306 comprises a network interface configured for high bandwidth communication.

Figure 4:
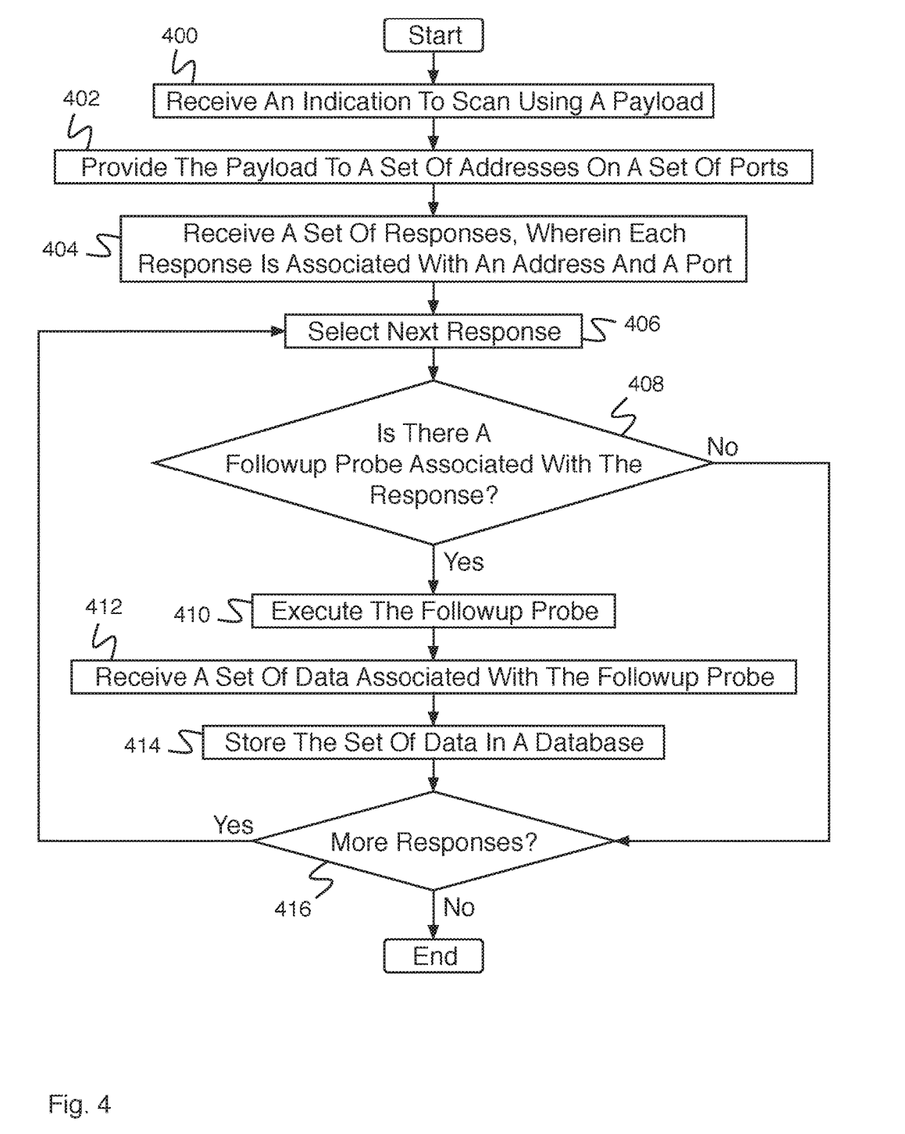
FIG. 4 is a flow diagram illustrating an embodiment of a process for hierarchical scanning.

FIG. 4 is a flow diagram illustrating an embodiment of a process for hierarchical scanning. In some embodiments, the process of FIG. 4 is executed by hierarchical scanning system 104 of FIG. 1. In the example shown, in 400, an indication to scan using a payload is received. In some embodiments, the indication is received from an administrator system. In some embodiments, the payload comprises a payload of a set of payloads stored in a payload storage. In various embodiments, different payloads are capable of scanning different device types, scanning different networks, scanning for different information, or are different in any other appropriate way. In some embodiments, the indication comprises an indication of a set of addresses to scan. In some embodiments, the addresses comprise all addresses (e.g., all internet protocol version 4 (IPv4) address, all internet protocol version 6 (IPv6) addresses, etc.). In some embodiments, the addresses comprise the addresses of a network of interest. In some embodiments, the indication comprises an indication of a set of ports at each address to scan. In some embodiments, the set of ports comprises all ports. In some embodiments, the set of ports comprises one or more ports determined to be associated with a service of interest. In some embodiments, the indication comprises an indication of a follow-up probe of interest (e.g., the indication comprises an indication to scan for information that can be gathered using the follow-up probe of interest). In 402, the payload is provided to a set of addresses on a set of ports. In various embodiments, the payload comprises one or more of the following: a request for capabilities, a hello packet, a heartbeat packet request, a probing request, a request for any response, an existence response, or any other appropriate payload. In various embodiments, the payload comprises a user datagram protocol (UDP) packet (e.g., a wildcard netBios name request), a session initiation protocol (SIP) options request, a universal plug and play (UPNP) discovery message, a simple network management protocol (SNMP) community string, or any other appropriate payload. In 404, a set of responses is received, wherein each response is associated with an address and a port. In some embodiments, the address and port associated with a response comprise the address and port to which the payload was sent provoking the response. In some embodiments, not all addresses and ports provide a response when provoked with the payload. In 406, the next response (e.g., of the set of responses) is selected. In some embodiments, the next response comprises the first response. In 408, it is determined whether there is a follow-up probe associated with the response. In some embodiments, only a subset of all follow-up probes are considered (e.g., the scan is only for information that can be gathered using a predetermined follow-up probe). In the event it is determined that there is not a follow-up probe associated with the response, control passes to 416. In the event it is determined that there is a follow-up probe associated with the response, control passes to 410. In 410, the follow-up probe (e.g., the follow-up probe associated with the response) is executed. In various embodiments, executing the follow-up probe comprises providing a follow-up payload and receiving a response, establishing an unencrypted connection, requesting unencrypted data, establishing an encrypted connection, requesting encrypted data, determining other addresses or ports to probe, or executing any other appropriate follow-up probe. In various embodiments, an unencrypted connection comprises a hypertext transfer protocol (HTTP) connection, a file transfer protocol (FTP) connection, a Modbus connection, a simple mail transfer protocol (SMTP) connection, a Telnet connection, or any other appropriate connection. In some embodiments, the follow-up probe uses an industrial system protocol for communications for systems/devices connected to the network (e.g., a probe asking who are you? using a protocol). In various embodiments, an unencrypted connection uses one of the following protocols: Windriver debug remote procedure call (WDBRPC), building automation and control networks (BacNet), EtherNet, EtherNet/IP, distributed network protocol (DNP3), Niagara Fox, General Equipment service request transport protocol (GE-SRTP), highway addressable remote transducer over internet portocol (HART-IP), ProConOS™, Siemens S7, PCWorx, or any other appropriate protocol. In various embodiments, an encrypted connection comprises a hypertext transfer protocol secure (HTTPS) connection, a file transfer protocol secure (FTPS) connection, a secure shell file transfer protocol (SFTP) connection, a secure shell (SSH) connection, a simple mail transfer protocol secure (SMTPS) connection, or any other appropriate connection. In various embodiments, the follow-up probe comprises a follow-up probe for collecting universal plug and play (UPNP) information, for collection network basic input/output system (NetBIOS)

information, for collecting domain name server (DNS) information, or for collecting any other appropriate information. In 412, a set of data associated with the follow-up probe is received. In 414, the set of data is stored in a database (e.g., a database on the hierarchical scanning system, a database in the cloud, etc.). In 416, it is determined whether there are more responses (e.g., of the set of responses). In the event it is determined that there are more responses, control passes to 406. In the event it is determined that there are not more responses, the process ends.

Figure 5:
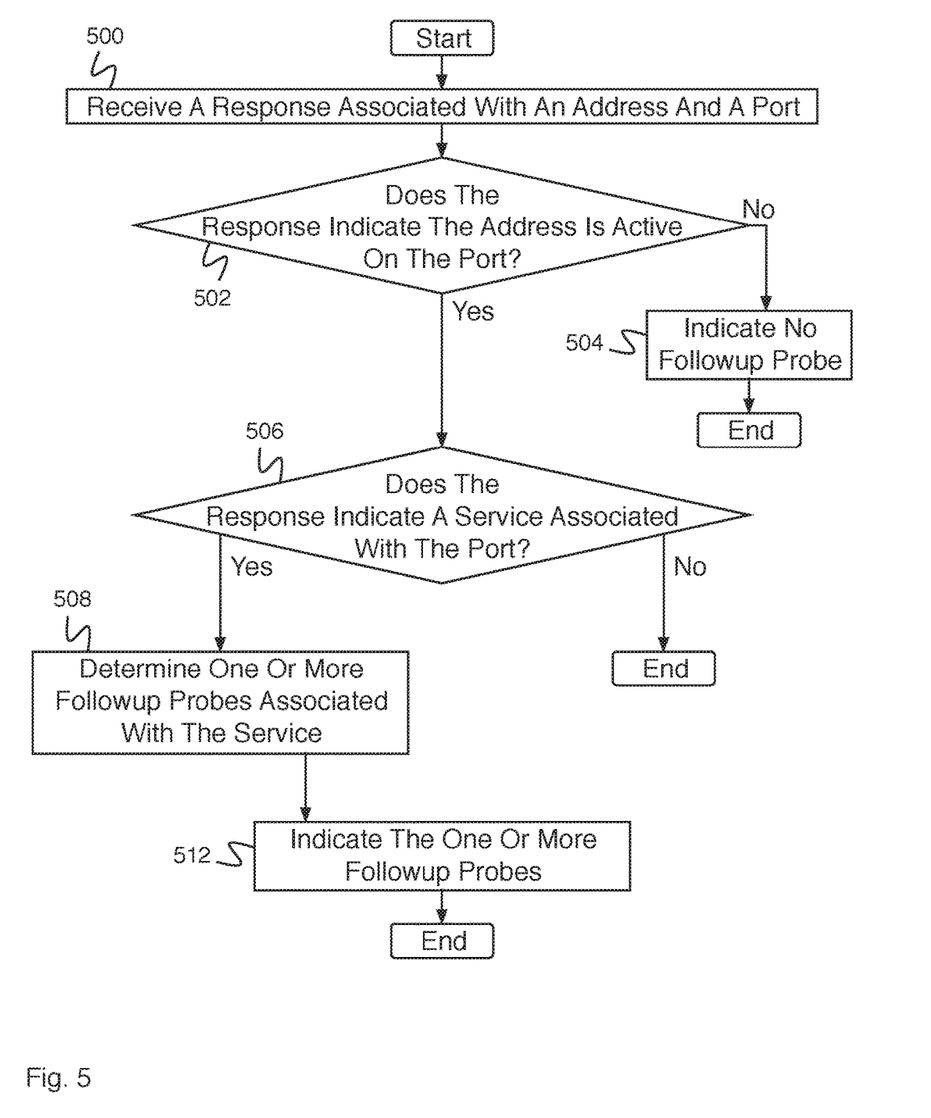
FIG. 5 is a flow diagram illustrating an embodiment of a process for determining whether there is a follow-up probe associated with a response.

FIG. 5 is a flow diagram illustrating an embodiment of a process for determining whether there is a follow-up probe associated with a response. In some embodiments, the process of FIG. 5 implements 408 of FIG. 4. In the example shown, in 500, a response associated with an address and a port is received. In 502, it is determined whether the response indicates the address is active on the port. In the event it is determined that the response indicates the address is active on the port, control passes to 506. In the event it is determined that the response indicates the address is not active on the port, control passes to 504. In 504, the process indicates that there is no follow-up probe, and the process ends. In 506, it is determined whether the response indicates a service associated with the port. In some embodiments, determining whether the response indicates a service associated with the port comprises examining the response for an indication of a service. In the event it is determined that the response indicates a service associated with the port, control passes to 508. In 508, one or more follow-up probes associated with the service are determined. In some embodiments, the one or more follow-up probes are determined by looking up the service in a follow-up probe table. Control then passes to 512. In the event it is determined in 506 that the response does not indicate a service associated with the port, the process ends.

Figure 6:
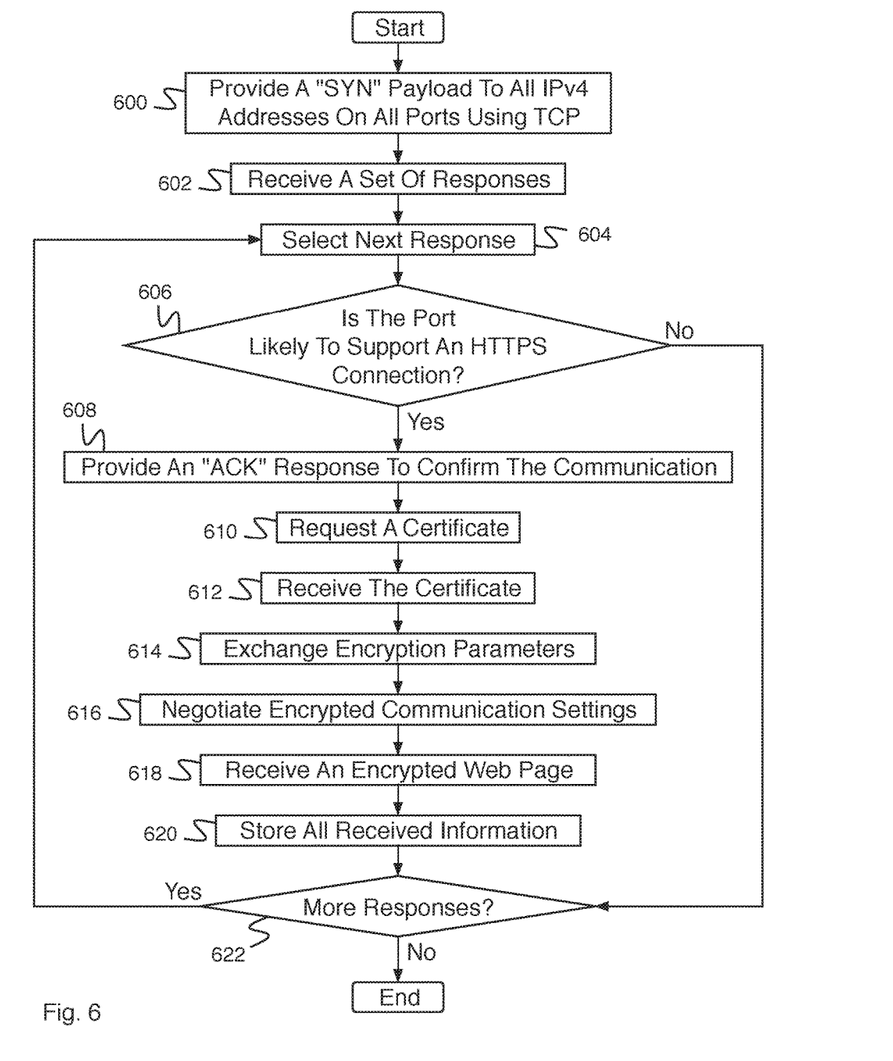
FIG. 6 is a flow diagram illustrating an embodiment of a process for scanning for secure hypertext transfer protocol (HTTPS) connections.

FIG. 6 is a flow diagram illustrating an embodiment of a process for scanning for secure hypertext transfer protocol (HTTPS) connections. In some embodiments, the process of FIG. 6 comprises an implementation of the process of FIG. 4. In the example shown, in 600, a "SYN" payload is provided to all IPv4 addresses on all ports using transfer control protocol (TCP). In 602, a set of responses is received. In some embodiments, positive responses to a "SYN" payload (e.g., indicating that the port supports communication) comprise an "ACK" packet. In 604, the next response (e.g., of the set of responses) is selected. In some embodiments, the next response comprises the first response. In some embodiments, the selected response is associated with a port on an address. In 606, it is determined whether the port (e.g., the port on the address associated with the selected response) is likely to support an HTTPS connection. In some embodiments, other tests for other connection types (e.g., FTPS, SFTP, FTP, HTTP, SSH, etc.) are also performed. In some embodiments, the process determines whether the port is likely to support an HTTPS connection based at least in part on a port/protocol table (e.g., a table of likely protocols supported by each port). In the event it is determined that the port is not likely to support an HTTPS connection, control passes to 622. In the event it is determined that the port is likely to support an HTTPS connection, control passes to 608. In 608, a "SYN-ACK" response is provided (e.g., to the port on the address) to confirm the communication. In 610, a certificate is requested. In some embodiments, a certificate comprises a certificate authenticating the network device or service at the address. In some embodiments, a certificate comprises a certificate that is digitally signed by a trusted authority. In 612, the certificate is received. In some embodiments, the certificate is analyzed for authenticity. In some embodiments, in the event that the certificate fails authenticity analysis, then an indication is stored that the certificate fails. In 614, encryption parameters are exchanged. In some embodiments, encryption parameters comprise Diffie-Hellman encryption parameters. In 616, encrypted communication settings are negotiated. In some embodiments, negotiating encrypted communication settings comprises agreeing on a set of communication settings (e.g., that both the hierarchical scanning system and the network system are configured to use to communicate). In some embodiments, the hierarchical scanning system requests to communicate with the network system using all known communication settings in order to determine which communication settings the network system is configured to use. In 618, an encrypted web page is received. In 620, all received information (e.g., the address, the port, the certificate, the encryption parameters, the encrypted communication settings supported by the network system, the encrypted web page) is stored. In 622, it is determined whether there are more responses (e.g., of the set of responses). In the event it is determined that there are more responses, control passes to 604. In the event it is determined that there are not more responses, the process ends.

Figure 7:
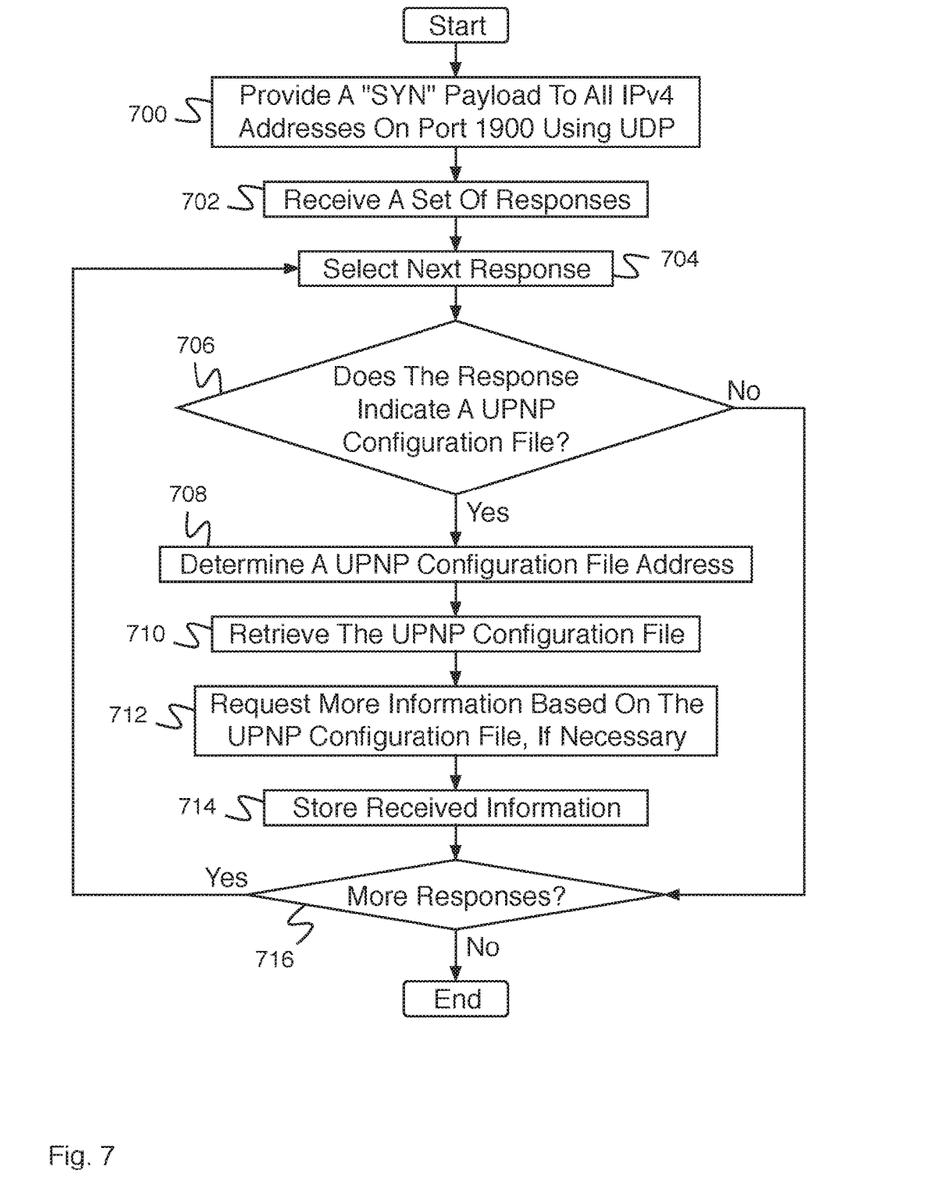
FIG. 7 is a flow diagram illustrating an embodiment of a process for scanning for universal plug and play (UPNP) information.

FIG. 7 is a flow diagram illustrating an embodiment of a process for scanning for universal plug and play (UPNP) information. In some embodiments, the process of FIG. 7 comprises an implementation of the process of FIG. 4. In the example shown, in 700, a UPNP discovery message is provided to all IPv4 addresses on port 1900 using user datagram protocol (UDP). In 702, a set of responses is received. In some embodiments, each response of the set of responses is associated with an address. In 704, the next response (e.g., of the set of responses) is received. In 706, it is determined whether the response indicates a UPNP configuration file. In some embodiments, a response indicating a UPNP configuration file follows a specific format and can be directly identified. In the event it is determined that the process does not indicate a UPNP configuration file, control passes to 716. In the event it is determined that the process indicates a UPNP configuration file, control passes to 708. In 708, a UPNP configuration file address is determined. In some embodiments, the UPNP configuration file address is determined directly from the response. In some embodiments, the UPNP configuration file address is determined based at least in part on the response and the address associated with the response (e.g., the response indicates a local path that is combined with the address associated with the response to determine the configuration file address). In 710, the UPNP configuration file is retrieved. In 712, more information is requested based on the UPNP configuration file, if necessary. In some embodiments, the UPNP configuration file indicates the presence of hardware, software, or configurations that correspond to further queries or follow-up probes. In 714, received information is stored. In 716, it is determined whether there are more responses (e.g., of the set of responses). In the event it is determined that there are more responses, control passes to 704. In the event it is determined that there are not more responses, the process ends.

Figure 8:
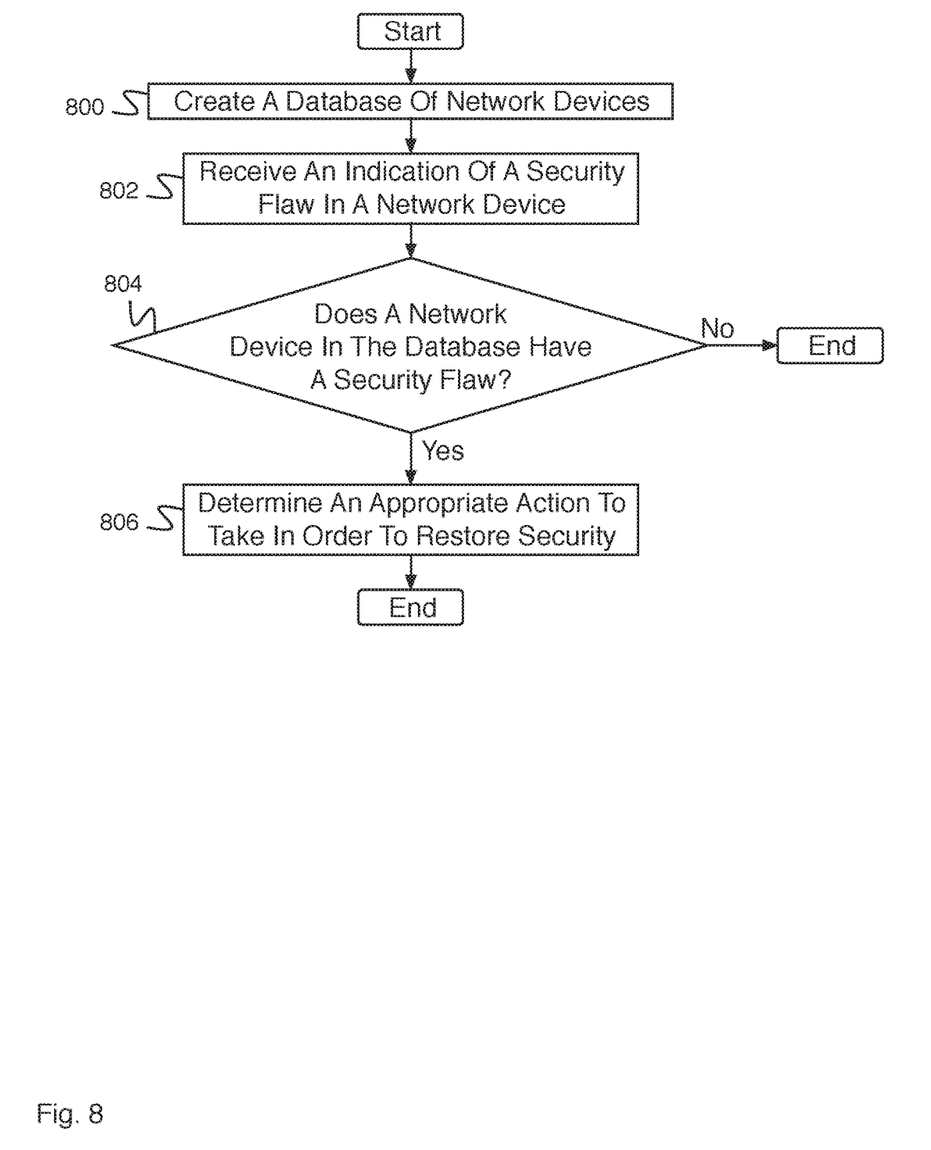
FIG. 8 is a flow diagram illustrating an embodiment of a process for maintaining security.

FIG. 8 is a flow diagram illustrating an embodiment of a process for maintaining security. In some embodiments, the process of FIG. 8 is executed by an administrator using an administrator system (e.g., administrator system 102 of FIG. 1). In the example shown, in 800, a database of network devices is created. In some embodiments, a database of network devices comprises a database of network hardware, network software, and network configurations. In some embodiments, a database of network devices is created using the process of FIG. 4. In 802, an indication of a security flaw in a network device is received. In various embodiments, an indication of a security flaw in a network device is received from a network device, from a security protection company, from the news media, from a trusted source, or from any other location. In 804, it is determined whether a network device in the database has a security flaw. In some embodiments, determining whether a device in the database has a security flaw comprises determining whether a network device in the database of network devices matches the network device indicated in 802. In the event it is determined that a network device in the database does not have a security flaw, the process ends. In the event it is determined that a network device in the database has a security flaw, control passes to 806. In 806, an appropriate action to take in order to restore security is determined. In various embodiments, an appropriate action to take in order to restore security comprises disconnecting the network device, changing the configuration of the network device, updating the software of the network device, or any other appropriate action to restore security.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for hierarchical scanning to identify security vulnerabilities, comprising:
    an interface configured to scan a set of addresses on a set of ports using a payload, and receive a set of responses, wherein each response is associated with an address and a port; and
    a processor configured to:
        determine that a follow-up probe exists associated with a first response of the set of responses, wherein the first response indicates a universal plug and play (UPnP) configuration file; and
        execute the follow-up probe on the address and the port associated with the first response, wherein the follow-up probe includes programmed steps:
            retrieve the UPnP configuration file, the UPnP configuration file indicating presence of hardware, presence of software, or a combination thereof;
            request additional information on the hardware, the software, or a combination thereof;
            store a set of data received in response to the follow-up probe in a database; and
            determine an appropriate action to restore security based on the set of data.

2. The system of claim 1, wherein the interface is further to receive an indication of a set of addresses to scan.

3. The system of claim 2, wherein the set of addresses comprises all addresses of a network.

4. The system of claim 1, wherein the interface is further to receive an indication of a set of ports to scan.

5. The system of claim 4, wherein the set of ports to scan comprises all ports.

6. The system of claim 1, wherein the addresses comprise IPv4 addresses.

7. The system of claim 1, wherein the addresses comprise IPv6 addresses.

8. The system of claim 1, wherein the payload comprises a SYN packet.

9. The system of claim 1, wherein the payload is provided using a TCP protocol.

10. The system of claim 1, wherein the payload is provided using a UDP protocol.

11. The system of claim 1, wherein the follow-up probe comprises a follow-up collecting probe for collecting UPNP information, NetBIOS information, or DNS information.

12. The system of claim 1, wherein the follow-up probe comprises a follow-up unencrypted probe for establishing an unencrypted connection.

13. The system of claim 12, wherein the unencrypted connection comprises an HTTP connection, a FTP connection, a Modbus connection, a SMTP connection, or a Telnet connection.

14. The system of claim 1, wherein the follow-up probe comprises a follow-up encrypted probe for establishing the encrypted connection.

15. The system of claim 14, wherein the encrypted connection comprises an HTTPS connection, a FTPS connection, a SFTP connection, a SSH connection, or a SMTPS connection.

16. The system of claim 14, wherein establishing the encrypted connection comprises receiving a certificate.

17. The system of claim 1, wherein the follow-up probe comprises a follow-up ipv4 probe for determining IPv4 addresses to scan.

18. The system of claim 1, wherein the database is used to determine one or more network devices with a known vulnerability.

19. A method for hierarchical scanning to identify security vulnerabilities, comprising:
    scanning a set of addresses on a set of ports using a payload;
    receiving a set of responses, wherein each response is associated with an address and a port;
    determining, using a processor, that a follow-up probe is associated with a first response, wherein the first response indicates a universal plug and play (UPnP) configuration file;
    executing the follow-up probe on the address and the port associated with the first response, wherein the follow-up probe includes programmed steps:
        retrieving the UPnP configuration file, the UPnP configuration file indicating presence of hardware, presence of software, or a combination thereof;
        requesting additional information on the hardware, the software, or a combination thereof;
        storing a set of data received in response to the follow-up probe in a database; and
        determining an appropriate action to restore security based on the set of data.

20. A computer program product for hierarchical scanning to identify security vulnerabilities, the computer program product being embodied in a non-transitory computer readable storage medium and comprising computer instructions for:
    scanning a set of addresses on a set of ports using a payload;
    receiving a set of responses, wherein each response is associated with an address and a port;
    determining, using a processor, that a follow-up probe is associated with a first response, wherein the first response indicates a universal plug and play (UPnP) configuration file; and executing the follow-up probe on the address and the port associated with the first response, wherein the follow-up probe includes programmed steps:
retrieving the UPnP configuration file, the UPnP configuration file indicating presence of hardware, presence of software, or a combination thereof;
requesting additional information on the hardware, the software, or a combination thereof;
storing a set of data received in response to the follow-up probe in a database; and
determining an appropriate action to restore security based on the set of data.

\* \* \* \* \*